(12) United States Patent
Frank et al.

(10) Patent No.: US 7,383,032 B2
(45) Date of Patent: Jun. 3, 2008

(54) CELLULAR PHONE AND METHOD FOR RECEIVING AND TRANSMITTING SIGNALS OF DIFFERENT FREQUENCY BANDS

(75) Inventors: Michael Louis Frank, Los Gatos, CA (US); Allen Tze-Chung Chien, San Ramon, CA (US)

(73) Assignee: Avago Technologies Wireless IP Pte Ltd, Singapore (SG)

( * ) Notice: Subject to any disclaimer, the term of this patent is extended or adjusted under 35 U.S.C. 154(b) by 441 days.

(21) Appl. No.: 11/004,239

(22) Filed: Dec. 2, 2004

(65) Prior Publication Data

US 2006/0121865 A1 Jun. 8, 2006

(51) Int. Cl.
*H04B 1/18* (2006.01)
(52) U.S. Cl. ............ 455/183.2; 455/118; 455/127.3; 455/67.11; 455/82
(58) Field of Classification Search ............ 455/183.2, 455/118, 127.3, 67.11, 82
See application file for complete search history.

(56) References Cited

U.S. PATENT DOCUMENTS

2004/0137862 A1* 7/2004 Tanaka et al. ............ 455/127.3

| 2004/0162107 | A1  |   8/2004 | Klemetti et al. |
| 2005/0014476 | A1* |   1/2005 | Oono et al. ................. 455/118 |
| 2005/0057426 | A1* |   3/2005 | Itkin ......................... 343/876 |
| 2005/0186914 | A1* |   8/2005 | Heaton et al. ........... 455/67.11 |
| 2005/0266805 | A1* |  12/2005 | Jensen ........................ 455/82 |

FOREIGN PATENT DOCUMENTS

EP  0823751  * 2/1998

* cited by examiner

*Primary Examiner*—Sanh D. Phu

(57) ABSTRACT

A cellular phone and method for receiving and transmitting signals of different frequency bands and wireless standards utilizes an architecture that allows the use of switches that are less expensive and less lossy than switches used in comparable cellular phones. The architecture also allows the use of only narrow-banded antennas, rather than a combination of a narrow-banded antenna and a harmonic antenna. As a result, the performance of the cellular phone can be significantly improved.

18 Claims, 3 Drawing Sheets

CELLULAR PHONE AND METHOD FOR RECEIVING AND TRANSMITTING SIGNALS OF DIFFERENT FREQUENCY BANDS

BACKGROUND OF THE INVENTION

Currently, numerous frequency bands and standards are used in different regions around the world for cellular phones. Many cellular service providers support more than one region of the world. Consequently, service providers require cellular phones that can be used throughout their system. However, since phone manufacturers produce phones for number of service providers, "universal" cellular phones that are compatible to principal frequency bands and standards used throughout the world are being developed.

There are five principal frequency bands used in Europe, much of Asia and North America. These principal frequency bands are 850, 900, Digital Communications System (DCS), Personal Communications Services (PCS), and Universal Mobile Telecommunications System (UMTS). The regions where the principal frequency bands are used and the associated transmit and receive frequencies are set forth in the following table.

| Band Name/Region | Transmit Frequency | Receive Frequency |
| --- | --- | --- |
| 850/North America | 824 to 849 MHz | 869 to 894 MHz |
| 900/Europe and Asia | 880 to 915 MHz | 925 to 960 MHz |
| DCS/Europe and Asia | 1710 to 1785 MHz | 1805 to 1880 MHz |
| PCS/North America | 1850 to 1910 MHz | 1930 to 1990 MHz |
| UMTS/Europe and Asia | 1920 to 1980 MHz | 2110 to 2170 MHz |

These bands are also typically, but not exclusively, used elsewhere in the world.

However, the bulk of the cell band communication occurs in these bands. Cellular phones currently in production support only some of these bands.

In addition to the different frequency bands, the universal cellular phones must support different standards being used. In some standards, such as Global System for Mobile communications (GSM), communication signals are transmitted and received in an alternating fashion, so called half duplex. In other standards, such as Wideband Code Division Multiple Access (WCDMA), communication signals are transmitted and received in a simultaneous manner, so called full duplex.

Another design consideration for universal cellular phones is the overall size of the phones. Smaller cellular phones are desired in the market place, and thus, the universal cellular phones must be small in size. An antenna is among the largest components in a cellular phone. In order to minimize the size of cellular phones, smaller antennas are being used in cellular phones. However, as an antenna is made smaller, the frequency response of the antenna becomes more difficult to manage. Small antennas are good only for signals higher in frequency or are inherently narrowband.

A small antenna can be made to respond to multiple frequencies, but it is easier if the frequencies are harmonically related. This is reflected in 900 and DCS bands, which can both be accommodated using a single small harmonic antenna. Furthermore, it turns out that 850 and PCS bands are close enough to 900 and DCS bands that the same antenna can be used for all four bands. A switch is used to selectively connect the harmonic antenna to a desired transmit or receive signal path for 850, 900, DCS and PCS bands. Power amplifiers are sufficiently broadband that each can handle two bands. Thus, one amplifier can be used for both 850 and 900 bands, and another amplifier can be used for both DCS and PCS bands. Consequently, only two switch states are required for four transmit states. Receivers, however, have input band limiting filters, and so typically require separate switch states for each band. These can all be combined into one branch, as shown in FIG. 1. As the performance of the switch is a function of the number of throws, such a scheme minimizes the loss in the transmit state, with a minor increase in the receive states. The receive states can be reduced to two by utilizing a combining scheme at the receive filters. Doing so reduces the switch loss in the receive path, but increases the loss of the filters, and so presents little net benefit. Two transmit signal paths and four receive signal paths are required to accommodate 850, 900, DCS and PCS bands. Thus, the switch needs to be a three-by-four switch to be able to connect the antenna to one of the signal paths. However, UMTS band cannot be effectively accommodated using this harmonic antenna. Therefore, a typical prior art universal cellular phone uses two antennas to accommodate all five principal bands, one harmonic antenna for the 850, 900, DCS and PCS bands and one narrow-banded antenna for UMTS band.

The components required by this architecture, including the switch, can be used as well in any cellular phone that is designed for some subset of all these bands. If UMTS band is not required, then the components for UMTS band are not populated in the cellular phone. As an example, if a cellular phone is aimed for North America, the UMTS components can be replaced by PCS WCDMA components.

However, in North America, service providers require cellular phones to support WCDMA in both PCS and 850 bands. The 850 band for WCDMA ("850 WCDMA") cannot utilize the narrow-banded antenna used for UMTS or PCS WCDMA, but rather must use the harmonic antenna used for 850, 900, DCS and PCS bands. Consequently, the switch must now be modified to a four-by-four switch, as shown in FIG. 2, which makes the switch more expensive and more lossy. Furthermore, if the same modified switch is used for all cellular phones, then these problems will exist even in Europe and Asia.

In view of the above-described concerns, what is needed is a cellular phone and method for transmitting and receiving signals that can accommodate GSM in 850, 900, DCS and PCS bands and WCDMA in 850, PCS and UMTS bands with less expensive and/or better performing components than the compatible components used in prior art cellular phones.

SUMMARY OF THE INVENTION

A cellular phone and method for receiving and transmitting signals of different frequency bands and wireless standards utilizes an architecture that allows the use of switches that are less expensive and less lossy than switches used in comparable cellular phones. The architecture also allows the use of only narrow-banded antennas, rather than a combination of a narrow-banded antenna and a harmonic antenna. As a result, the performance of the cellular phone can be significantly improved.

A cellular phone in accordance with an embodiment of the invention comprises a first antenna configured to exclusively transmit and receive signals of low frequency bands, the low frequency bands including frequencies lower than 1000 MHz, a second antenna configured to exclusively transmit and receive signals of high frequency bands, the high frequency bands including frequencies higher than 1000 MHz, a first switch connected to the first antenna and a plurality of low band signal paths, the first switch being configured to selectively connect the first antenna to one of the low band signal paths, and a second switch connected to the second antenna and a plurality of high band signal paths, the second switch being configured to selectively connect the second antenna to one of the high band signal paths.

A method for receiving and transmitting signals of different frequency bands in accordance with an embodiment of the invention comprises receiving incoming signals of a specific frequency band at a particular antenna of first and second antennas, selectively routing the incoming signals to one of multiple signal paths using a switch connected to the particular antenna, selectively routing outgoing signals of the particular frequency band from one of the multiple signals paths to the particular antenna using the switch, and transmitting the outgoing signals from the particular antenna. The first antenna is configured to transmit and receive signals of low frequency bands, the low frequency bands being lower than 1000 MHz. The second antenna is configured to transmit and receive signals of high frequency bands, the high frequency bands being higher than 1000 MHz.

Other aspects and advantages of the present invention will become apparent from the following detailed description, taken in conjunction with the accompanying drawings, illustrated by way of example of the principles of the invention.

DETAILED DESCRIPTION

A cellular phone and method for receiving and transmitting radio frequency (RF) signals of different frequency bands and wireless standards in accordance with the invention utilizes an architecture that allows the use of switches that are less expensive and less lossy than switches used in comparable cellular phones. Furthermore, the architecture does not require the use of a harmonic antenna with a wide frequency response. Instead, the architecture allows the use of narrow-banded antennas, which can be made into more efficient radiators than the harmonic antennas. Therefore, the performance of the cellular phone can be significantly improved over comparable cellular phones.

Figure 1:
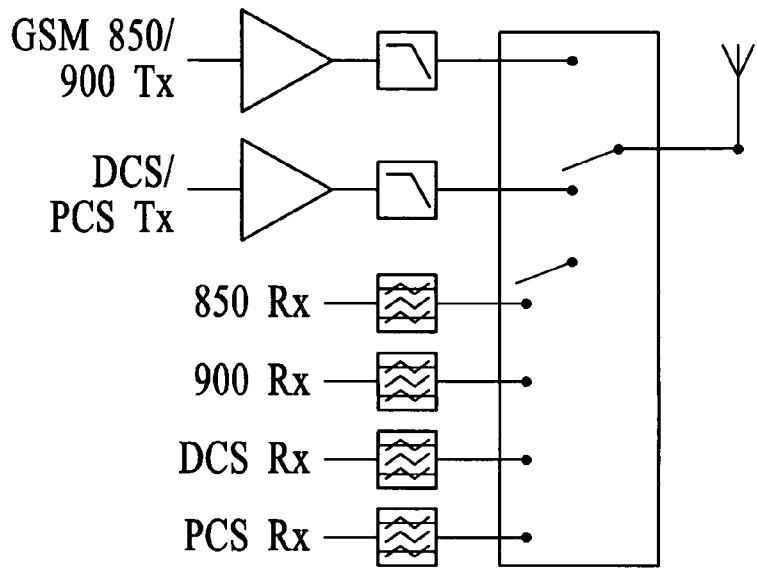
FIG. 1 is a diagram of a prior art cellular phone that can accommodate 850, 900, DCS and PCS bands.
Figure 2:
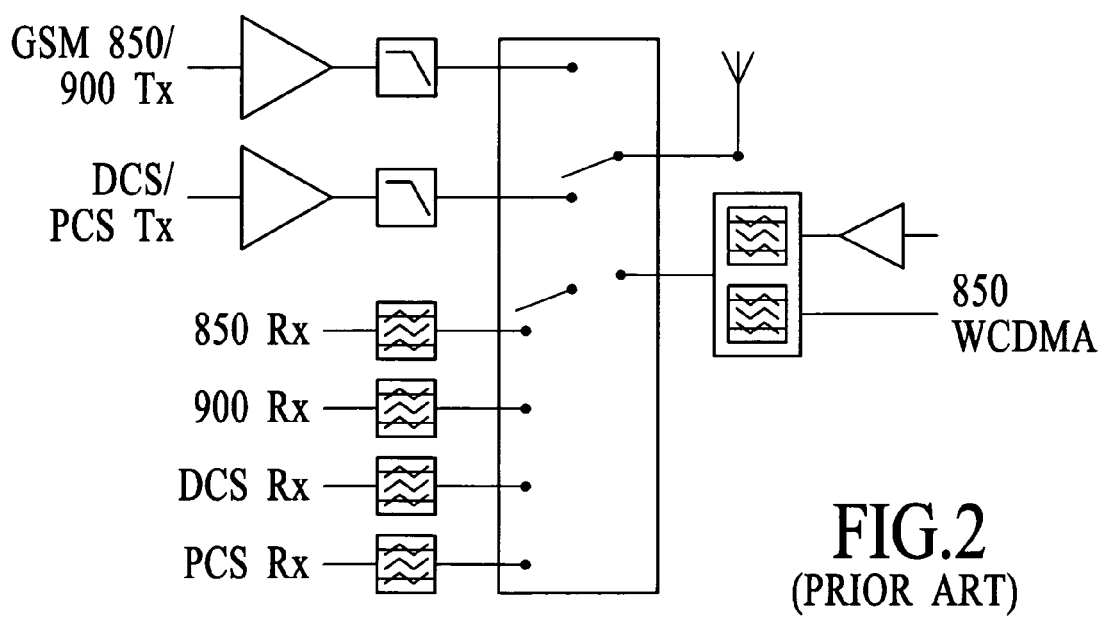
FIG. 2 is a diagram of a prior art cellular phone that can accommodate 850, 900, DCS, PCS and 850 WCDMA bands.
Figure 3:
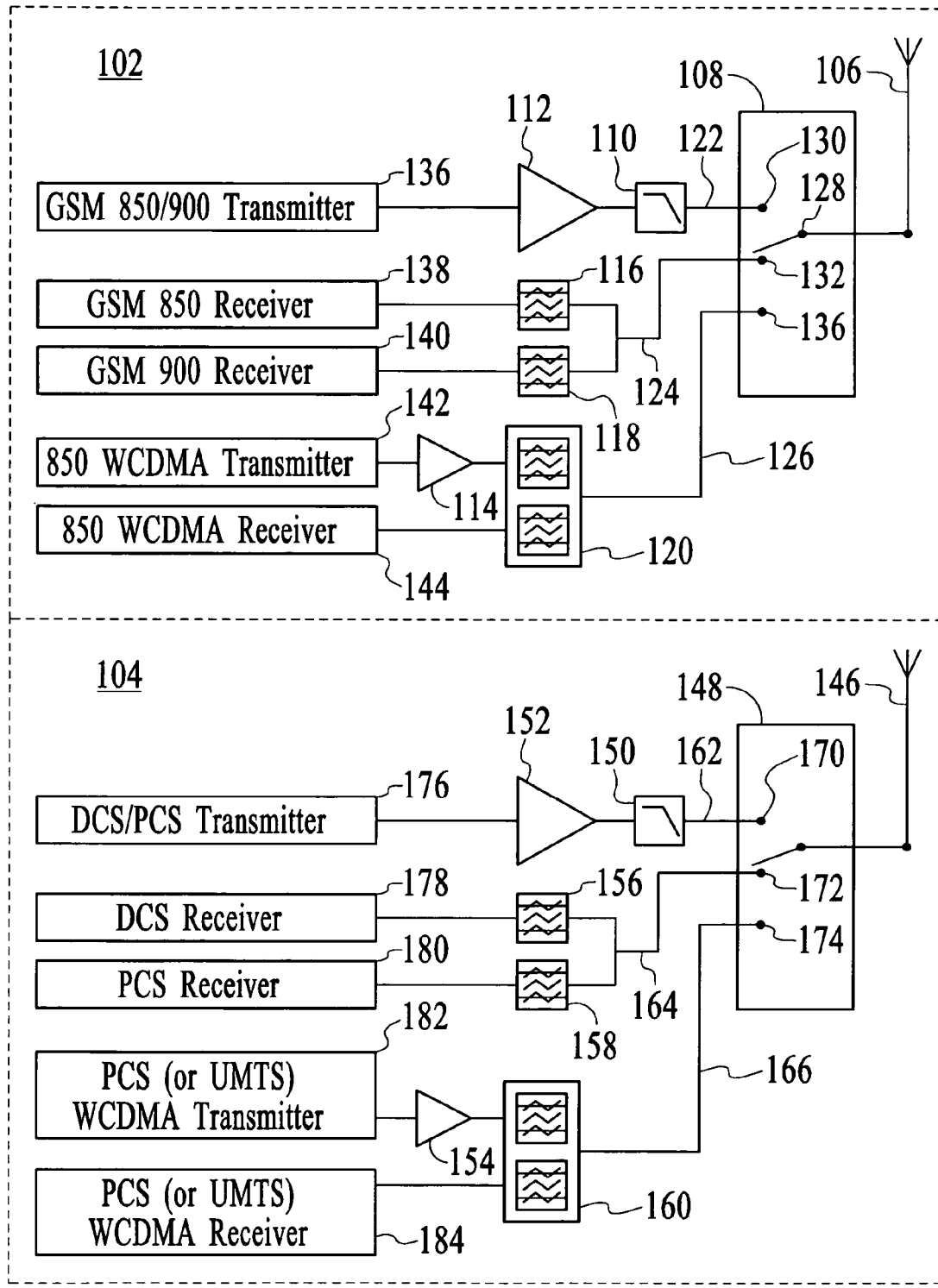
FIG. 3 is a diagram of a cellular phone that can receive and transmit signals of different frequency bands and standards in accordance with an embodiment of the invention.

With reference to FIG. 3, a cellular phone 100 in accordance with an embodiment of the invention is described. The cellular phone 100 is designed to accommodate Global System for Mobile communications (GSM) 850, GSM 900, Digital Communications System (DCS), Personal Communications Services (PCS), 850 Wideband Code Division Multiple Access (WCDMA) and PCS WCDMA (or Universal Mobile Telecommunications System (UMTS)). As used herein, "PCS" without any other acronym refers to either the PCS band or PCS for GSM standard. However, the architecture of the cellular phone 100 may be used to accommodate different frequency bands and/or standards. The cellular phone 100 includes a low band unit 102 and a high band unit 104. The low band unit 102 is used to receive and transmit wireless signals of low frequency bands, which are defined herein as including frequencies lower than 1000 MHz. In particular, the low frequency bands include bands in a frequency range from approximately 800 MHz to 1000 MHz. In an exemplary embodiment, the low frequency bands include 850 and 900 bands. Thus, the low band unit 102 is used to receive and transmit wireless signals for GSM 850, GSM 900 and 850 WCDMA. The high band unit 104 is used to receive and transmit wireless signals of high frequency bands, which are defined herein as including frequencies higher than 1000 MHz. In particular, the high frequency bands include bands in a frequency range from approximately 1800 MHz to 2200 MHz. In the exemplary embodiment, the high frequency bands include DCS and PCS, or DCS, PCS and UMTS. Thus, the high band unit 104 is used to receive and transmit signals for DCS, PCS and PCS (or UMTS) WCDMA.

The low band unit 102 of the cellular phone 100 includes a narrow-banded antenna 106, a four-port switch 108, a lowpass filter 110, amplifiers 112 and 114, bandpass filters 116 and 118, a duplexer 120 and three low band signal paths 122, 124 and 126. The narrow-banded antenna 106 is designed to have a frequency response in the low frequency bands, as defined above. Thus, the frequency response of the antenna 106 exclusively includes frequencies lower than 1000 MHz. In particular, the frequency response of the antenna 106 includes frequencies from approximately 800 MHz to 1000 MHz, which is sufficient to support GSM 850, 850 WCDMA and GSM 900. Since high band performance is compromised, the narrow-banded antenna 106 can be made to be a more efficient radiator than a harmonic antenna, which is typically used to support low bands, such as GSM 850, 850 WCDMA and GSM 900, in conjunction with harmonic high bands, such as DCS and PCS.

The four-port switch 108 of the low band unit 102 is connected to the narrow-banded antenna 106 and the signals paths 122, 124 and 126. The switch 108 includes ports 128, 130, 132 and 134. The antenna 106 is connected to the port 128, while the signal paths 122, 124 and 126 are connected to the ports 130, 132 and 134, respectively. The switch 108 operates to selectively connect the antenna port 128 to one of the three signal path ports 130, 132 and 134 to receive signals of low frequency bands from or to transmit signals of low frequency bands to the antenna 106. The signal path 122 is a combined transmit signal path for GSM 850 and GSM 900. That is, the signal path 122 is used to transmit signals for both GSM 850 and GSM 900. The signal path 124 is a combined receive signal path for GSM 850 and GSM 900. That is, the signal path 124 is used to receive signals for both GSM 850 and GSM 900. The signal path 126 is a receive/transmit signal path for 850 WCDMA to simultaneously receive and transmit signals of 850 WCDMA.

The amplifier 112 and the lowpass filter 110 are located on the combined transmit signal path 122 for GSM 850 and GSM 900. The amplifier 112 is a high efficiency amplifier that generates harmonics in response to signals from a GSM 850/900 transmitter 136. The output of the amplifier 112 is connected to the lowpass filter 110, which operates as a harmonic filter.

The bandpass filters 116 and 118 are both connected to the combined receive signal path 124 for GSM 850 and GSM 900. The bandpass filter 116 operates to selectively transmit receiving signals of GSM 850 to a GSM 850 receiver 138. Similarly, the bandpass filter 118 operates to selectively transmit receiving signals of GSM 900 to a GSM 900 receiver 140.

The duplexer 120 is connected to the receive/transmit signal path 126 for 850 WCDMA. The duplexer 120 operates to distinguish between receiving and transmitting signals of 850 WCDMA. The duplexer 120 is connected to an 850 WCDMA transmitter 142 and an 850 WCDMA receiver 144. The transmitting signals from the 850 WCDMA transmitter 142 are first amplified by the amplifier 114 and then transmitted through the duplexer 120 to the antenna 106 via the switch 108. The receiving signals of 850 WCDMA are transmitted through the duplexer 120 to the 850 WCDMA receiver 144.

The high band unit 104 of the cellular phone 100 includes a narrow-banded antenna 146, a four-port switch 148, a lowpass filter 150, amplifiers 152 and 154, bandpass filters 156 and 158, a duplexer 160 and three high band signal paths 162, 164 and 166. The narrow-banded antenna 146 is designed to have a frequency response in the high frequency bands, as defined above. Thus, the frequency response of the antenna 146 exclusively includes frequencies higher than 1000 MHz. In particular, the frequency response of the antenna 146 includes frequencies from approximately 1700 MHz to 2200 MHz, which is sufficient to support DCS, PCS and PCS WCDMA (or UMTS WCDMA).

The four-port switch 148 of the high band unit 104 is connected to the narrow-banded antenna 146 and the signals paths 162, 164 and 166. The switch 148 includes ports 168, 170, 172 and 174. The antenna 146 is connected to the port 168, while the signal paths 162, 164 and 166 are connected to the ports 170, 172 and 174, respectively. The switch 148 operates to selectively connect the antenna port 168 to one of the three signal path ports 170, 172 and 174 to receive signals of high frequency bands from or to transmit signals of high frequency bands to the antenna 146. The signal path 162 is a combined transmit signal path for DCS and PCS. The signal path 164 is a combined receive signal path for DCS and PCS. The signal path 164 is a receive/transmit signal path for PCS WCDMA (or UMTS WCDMA).

The amplifier 152 and the lowpass filter 150 are located on the combined transmit signal path 162 for DCS and PCS. The amplifier 152 is a high efficiency amplifier that generates harmonics in response to signals from a DCS/PCS transmitter 176. The output of the amplifier 152 is connected to the lowpass filter 150, which operates as a harmonic filter.

The bandpass filters 156 and 158 are both connected to the combined receive signal path 164. The bandpass filter 156 operates to selectively transmit receiving signals of DCS to a DCS receiver 178. Similarly, the bandpass filter 158 operates to selectively transmit receiving signals of PCS to a PCS receiver 180.

The duplexer 160 is connected to the receive/transmit signal path 166. The duplexer 160 operates to distinguish between receiving and transmitting signals of PCS (or UMTS) WCDMA. The duplexer 160 is connected to a high band WCDMA transmitter 182, which can be either a PCS WCDMA transmitter or a UMTS WCDMA transmitter, and a high band WCDMA receiver 184, which can be either a PCS WCDMA receiver or a UMTS WCDMA receiver. The transmitting signals from the PCS (or UMTS) WCDMA transmitter 182 are first amplified by the amplifier 154 and then transmitted through the duplexer 160 to the antenna 146 via the switch 148. The receiving signals of PCS (or UMTS) WCDMA are transmitted through the duplexer 160 to the PCS (or UMTS) WCDMA receiver 184.

In contrast to conventional cellular phones with one harmonic antenna and one narrow-banded antenna that support GSM 850, GSM 900, DCS, PCS, 850 WCDMA and PCS (or UMTS) WCDMA, the cellular phone 100 uses two narrow-banded antennas 106 and 146, the antenna 106 for low frequency bands and the antenna 146 for high frequency bands. Thus, both narrow-banded antennas 106 and 146 of the cellular phone 100 can be made to be more efficient radiators. Furthermore, the cellular phone 100 uses two four-port switches 108 and 148, rather than a single six-port switch, as is the case for the conventional cellular phones. The four-port switches 108 and 148 are less expensive than the six-port switches. In addition, the four-port switches 108 and 148 are less lossy than the six-port switches. Therefore, the use of the narrow-banded antennas 106 and 146 and the four-port switches 108 and 148 can significantly increase the performance of the cellular phone 100.

Figure 4:
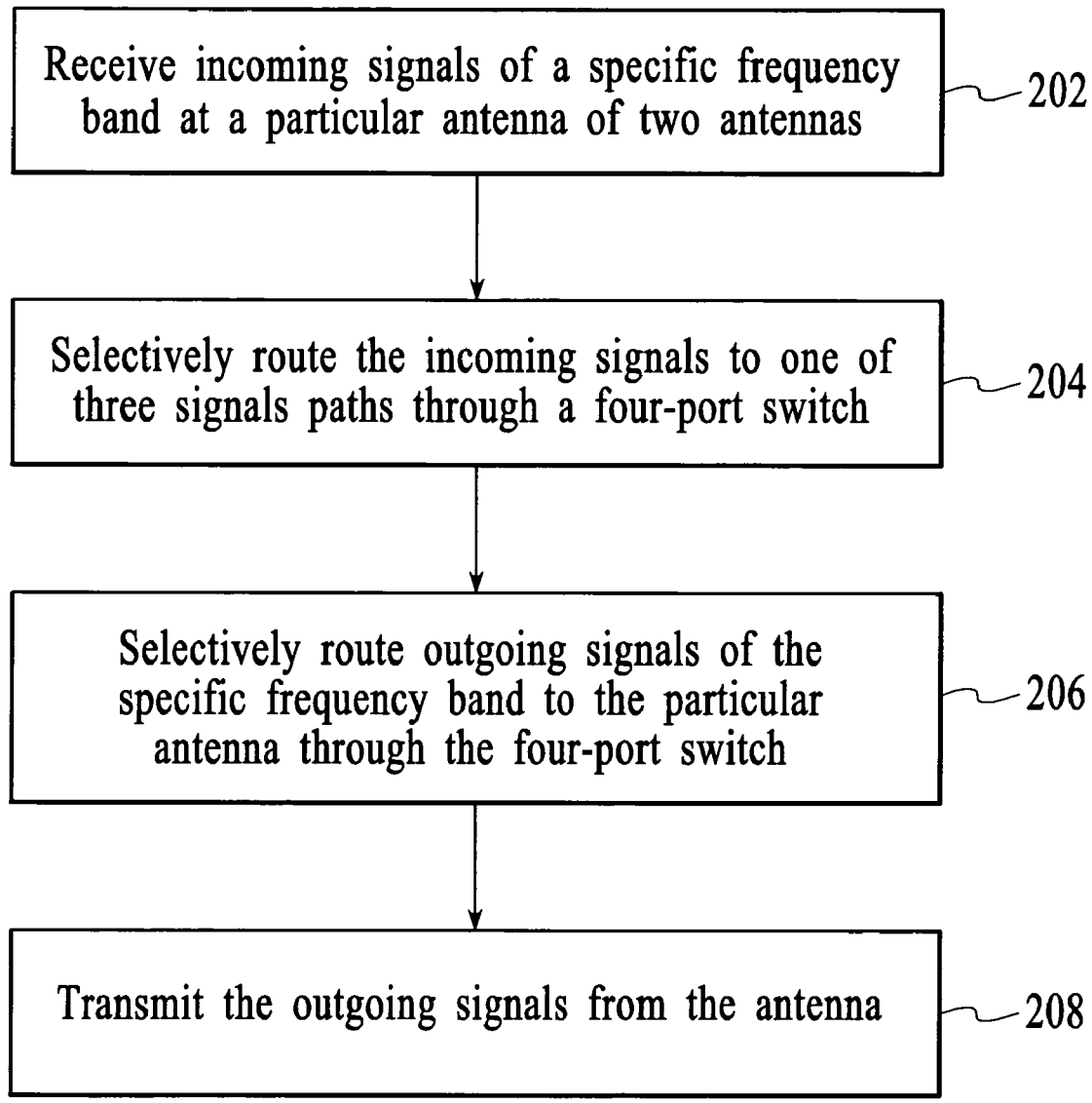
FIG. 4 is a flow diagram of a method for receiving and transmitting signals of different frequency bands and standards in accordance with an embodiment of the invention.

A method for receiving and transmitting RF signals of different frequency bands and wireless standards in accordance with an embodiment of the invention is described with reference to a flow diagram of FIG. 4. At block 202, incoming (receiving) signals of a specific frequency band are received at a particular antenna of two antennas. The first antenna is configured to exclusively transmit and receive signals of low frequency bands, which include frequencies lower than 1000 MHz. In particular, the low frequency bands may include frequencies between 800 MHz to 1000 MHz. In the exemplary embodiment, the low frequency bands include 850 and 900 bands. The second antenna is configured to exclusively transmit and receive signals of high frequency bands, which include frequencies higher than 1000 MHz. In particular, the high frequency bands may include frequencies between 1700 MHz to 2200 MHz. In the exemplary embodiment, the high frequency bands include DCS and PCS bands, or DCS, PCS and UMTS bands. Next, at block 204, the incoming signals are selectively routed one of three signal paths through a four-port switch connected to the particular antenna so that the incoming signals can be delivered to the proper receiver.

Next, at block 206, outgoing (transmitting) signals of the specific frequency band are selectively routed from one of the three signal paths to the particular antenna through the four-port switch. Next, at block 208, the outgoing signals are transmitted from the particular antenna.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A cellular phone for receiving and transmitting signals of different frequency bands, the cellular phone comprising:
   a first antenna configured to exclusively receive and transmit signals of low frequency bands, the low frequency bands including frequencies lower than 1000 MHz;
   a second antenna configured to exclusively receive and transmit signals of high frequency bands, the high frequency bands including frequencies higher than 1000 MHz;
   a first four-port switch connected to the first antenna and a plurality of low band signal paths, the first four-port switch being configured to selectively connect the first antenna to one of the low band signal paths; and a second four-port switch connected to the second antenna and a plurality of high band signal paths, the second four-port switch being configured to selectively connect the second antenna to one of the high band signal paths.

2. The cellular phone of claim 1 wherein the low frequency bands include frequencies from approximately 800 MHz to 1000 MHz, and wherein the high frequency bands include frequencies from approximately 1700 MHz to 2200 MHz.

3. The cellular phone of claim 2 wherein the low frequency bands consist of 850 band and 900 band, and wherein the high frequency bands consist of DCS band and PCS band, or consist of DCS band, PCS band and UMTS band.

4. The cellular phone of claim 1 further comprising a GSM 850/900 transmitter, a GSM 850 receiver and a GSM 850 receiver that are connected to the first antenna through some of the low band signal paths and the first four-port switch, and further comprising a DCS/PCS transmitter, a DCS receiver and a PCS receiver that are connected to the second antenna through some of the high band signal paths and the second four-port switch.

5. The cellular phone of claim 4 further comprising a lowpass filter, a first bandpass filter and a second bandpass filter, the lowpass filter being connected between the GSM 850/900 transmitter and the first four-port switch, the first bandpass filter being connected between the GSM 850 receiver and the first four-port switch, the second bandpass filter being connected between the GSM 900 receiver and the first four-port switch.

6. The cellular phone of claim 4 further comprising an 850 WCDMA transmitter and an 850 WCDMA receiver that are connected to the first antenna through one of the low band signal paths and the first four-port switch, and further comprising a high band WCDMA transmitter and a high band WCDMA receiver that are connected to the second antenna through one of the high band signal paths and the second four-port switch, the high band WCDMA transmitter being either a PCS WCDMA transmitter or a UMTS WCDMA transmitter, the high band WCDMA receiver being either a PCS WCDMA receiver or a UMTS WCDMA receiver.

7. The cellular phone of claim 6 further comprising first and second duplexers, the first duplexer being connected to the first four-port switch, the 850 WCDMA transmitter and the 850 WCDMA receiver to selectively transmit signals of 850 WCDMA between the first antenna, the 850 WCDMA transmitter and the 850 WCDMA receiver, the second duplexer being connected to the second four-port switch, the high band WCDMA transmitter and the high band WCDMA receiver to selectively transmit signals of high band WCDMA between the second antenna, the 850 WCDMA transmitter and the 850 WCDMA receiver.

8. A cellular phone for receiving and transmitting signals of different frequency bands, the cellular phone comprising:
a first narrow-banded antenna configured to exclusively receive and transmit signals of a first frequency range, the first frequency range being approximately 800 MHz to approximately 1000 MHz;
a second narrow-banded antenna configured to exclusively receive and transmit signals of a second frequency range, the second frequency range being approximately 1700 MHz to approximately 2200 MHz;
a first four-port switch connected to the first narrow-banded antenna and three low band signal paths, the first switch four-port being configured to selectively connect the first narrow-banded antenna to one of the three low band signal paths; and
a second four-port switch connected to the second narrow-banded antenna and three high band signal paths, the second four-port switch being configured to selectively connect the second narrow-banded antenna to one of the three high band signal paths.

9. The cellular phone of claim 8 wherein the low frequency bands consist of 850 band and 900 band, and wherein the high frequency bands consist of DCS band and PCS band, or consist of DCS band, PCS band and UMTS band.

10. The cellular phone of claim 9 further comprising a GSM 850/900 transmitter, a GSM 850 receiver and a GSM 900 receiver that are connected to the first narrow-banded antenna through some of the three low band signal paths and the first four-port switch, and further comprising a DCS/PCS s transmitter, a DCS receiver and a PCS receiver that are connected to the second narrow-banded antenna through some of the three high band signal paths and the second four-port switch.

11. The cellular phone of claim 10 further comprising a lowpass filter, a first bandpass filter and a second bandpass filter, the lowpass filter being connected between the GSM 850/900 transmitter and the first four-port switch, the first bandpass filter being connected between the GSM 850 receiver and the first four-port switch, the second bandpass filter being connected between the GSM 900 receiver and the first four-port switch.

12. The cellular phone of claim 10 further comprising an 850 WCDMA transmitter and an 850 WCDMA receiver that are connected to the second narrow-banded antenna through one of the three low band signal paths and the first four-port switch, and further comprising a high band WCDMA transmitter and a high band WCDMA receiver that are connected to the second narrow-banded antenna through one of the three high band signal paths and the second four-port switch, the high band WCDMA transmitter being either a PCS WCDMA transmitter or a UMTS WCDMA transmitter, the high band WCDMA receiver being either a PCS WCDMA receiver or a UMTS WCDMA receiver.

13. The cellular phone of claim 12 further comprising first and second duplexers, the first duplexer being connected to the first four-port switch, the 850 WCDMA transmitter and the 850 WCDMA receiver to selectively transmit signals of 850 WCDMA between the first narrow-banded antenna, the 850 WCDMA transmitter and the 850 WCDMA receiver, the second duplexer being connected to the second four-port switch, the high band WCDMA transmitter and the high band WCDMA receiver to selectively transmit signals of high band WCDMA between the second narrow-banded antenna, the 850 WCDMA transmitter and the 850 WCDMA receiver.

14. A method for receiving and transmitting signals of different frequency bands, the method comprising:
receiving incoming signals of a specific frequency band at a particular antenna of first and second antennas, the first antenna being configured to receive and transmit signals of low frequency bands, the low frequency bands including frequencies lower than 1000 MHz, the second antenna being configured to receive and transmit signals of high frequency bands, the high frequency bands including frequencies higher than 1000 MHz;
selectively routing the incoming signals to one of multiple signal paths using a four-port switch connected to the particular antenna;

selectively routing outgoing signals of the particular frequency band from one of the multiple signals paths to the particular antenna using the four-port switch; and transmitting the outgoing signals from the particular antenna.

15. The method of claim 14 wherein the low frequency bands include frequencies from approximately 800 MHz to 1000 MHz, and wherein the high frequency bands include frequencies from approximately 1700 MHz to 2200 MHz.

16. The method of claim 15 wherein the low frequency bands consist of 850 band and 900 band, and wherein the high frequency bands consist of DCS band and PCS band, or consist of DCS band, PCS band and UMTS band.

17. The method of claim 14 wherein the first antenna is connected to a GSM 850/900 transmitter, a GSM 850 receiver and a GSM 900 receiver, and wherein the second antenna is connected to a DCS/PCS transmitter, a DCS receiver and a PCS receiver.

18. The method of claim 17 wherein the first antenna is further connected to an 850 WCDMA transmitter and an 850 WCDMA receiver, and wherein the second antenna is further connected to a high band WCDMA transmitter and a high band WCDMA receiver, the high band WCDMA transmitter being either a PCS WCDMA transmitter or a UMTS WCDMA transmitter, the high band WCDMA receiver being either a PCS WCDMA receiver or a UMTS WCDMA receiver.

* * * * *